June 6, 1961 T. J. R. BRIGHT 2,986,793
DRAUGHT EXCLUDING STRIPS, BEADINGS, MOULDINGS AND THE LIKE
Original Filed May 2, 1955
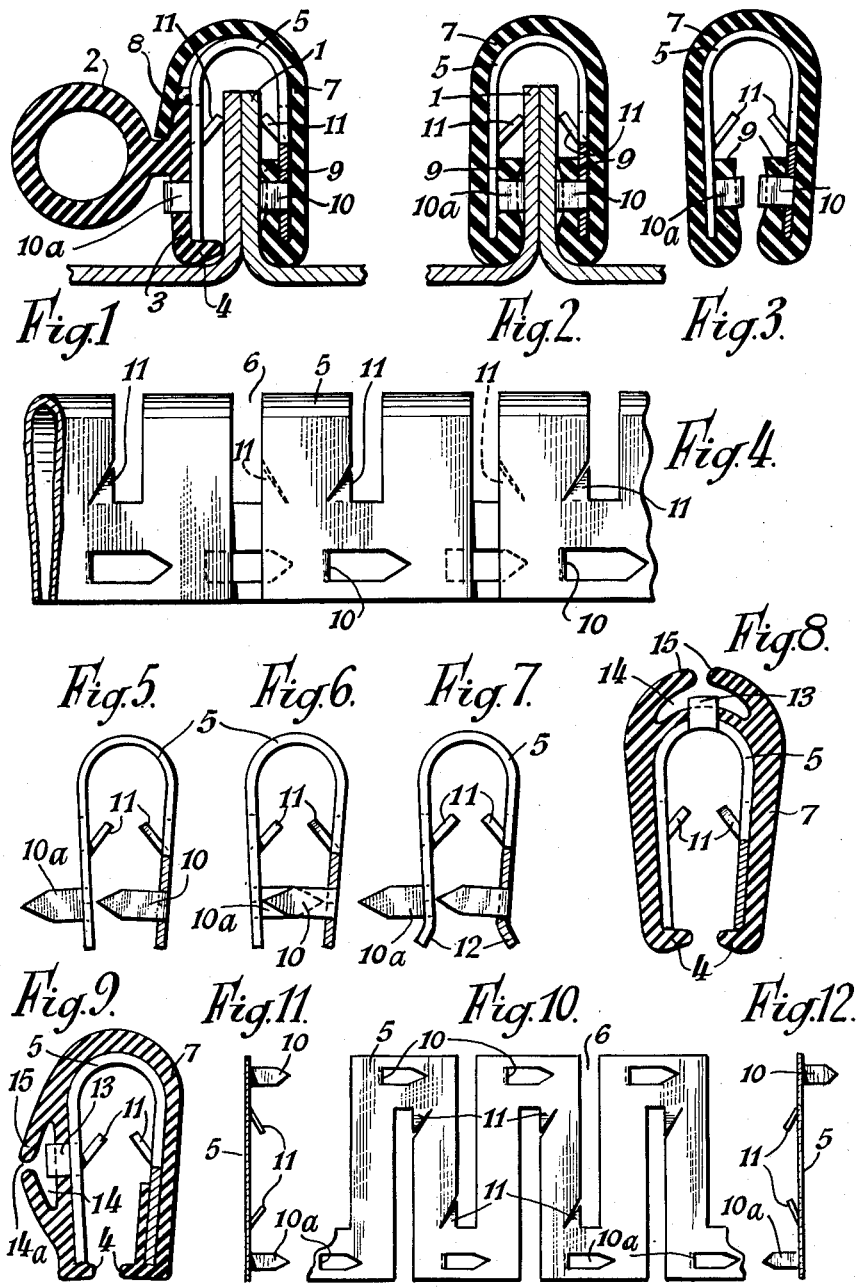
INVENTOR
Thomas John Robert Bright
BY Stevens, Davis, Miller & Mosher
ATTORNEYS

United States Patent Office 2,986,793
Patented June 6, 1961

2,986,793
DRAUGHT EXCLUDING STRIPS, BEADINGS, MOULDINGS AND THE LIKE
Thomas John Robert Bright, 270 Sandridge Road, Ottawa, Ontario, Canada
Original application May 2, 1955, Ser. No. 505,115. Divided and this application June 24, 1959, Ser. No. 822,621
2 Claims. (Cl. 24—259)

This invention relates to draught excluding strips, beadings, mouldings and the like of the kind which include an effective portion which in the case of a draught excluding or sealing strip is responsible for obtaining a good seal or in the case of a beading or moulding performs the useful purpose of a buffer or shock absorber and in a number of cases is ornamental in character. An example of such a strip forms the subject of my prior British Patent No. 649,137. Such strips particularly when intended for draught excluding or sealing purposes are intended especially for use on vehicles to ensure a good seal between the doors of the vehicle and the body, the doors when closed engaging the effective part and either compressing it slightly or temporarily distorting it so as to exclude draughts and moisture from the interior of the vehicle. Such strips with which the present invention is concerned include a channel shaped metal or other comparatively resilient clip extending throughout the length of the strip or a plurality of short clips in spaced or end-to-end relationship which clip or clips is or are adapted to straddle a supporting flange or equivalent part and secure the strip in position thereon.

In the various constructions of strip disclosed by the specification and drawings of my earlier patent above referred to the flange was either specially formed or shaped to receive the clip or carried a number of spaced spring tags which were engaged by the clip to maintain the strip in position.

The chief object of the present invention is to evolve a construction of strip which avoids the use of spring tags and obviates the necessity for the flange or equivalent part being specially formed.

A draught excluding strip, beading or moulding (hereinafter referred to as a strip) in accordance with the invention includes as hitherto an effective portion and channel shaped clip or clips to which the effective portion is attached but in this case the clip or clips is or are formed with tangs which project inwardly into the interior of the channel and frictionally grip the flange to maintain the clip or clips in position thereon, the effective portion being secured to the clip or clips in any suitable manner.

According to a further feature of the invention each clip is formed with two sets of tangs one set serving to secure the effective portion to the clip, whilst the other set serves to secure the clip to the flange or its equivalent.

Referring to the drawings:

FIGURE 1 is a sectional view of a draught excluding or sealing strip in accordance with the invention applied to a supporting flange;

FIGURE 2 is a similar view illustrating the application of the invention to a beading or moulding;

FIGURE 3 is a section of the beading or moulding before application to the supporting flange;

FIGURE 4 is a fragmentary side elevation of a continuous clip for use in either of the constructions shown in FIGURE 1 or FIGURES 2 to 3;

FIGURES 5, 6 and 7 are sectional views of a continuous clip illustrating three alternative arrangements of tangs;

FIGURE 8 is a sectional view illustrating an alternative form of draught excluding strip, beading or moulding;

FIGURE 9 is a sectional view of a further modified form of draught excluding strip;

FIGURE 10 is a fragmentary plan view of the strip from which the continuous clip previously illustrated may be formed; and FIGURES 11 and 12 are sectional views of the strip illustrated in FIGURE 10 showing alternative formations of the projecting tangs.

Referring in the first case to FIGURE 1 of the accompanying drawings which shows the application of the invention to a draught excluding or sealing strip for application to a flange immediately surrounding the door opening of a vehicle body, the flange is indicated generally by reference numeral 1, whilst the sealing strip comprises an effective portion 2 which in the example illustrated is of tubular form, the effective portion 2 being sandwiched under the closing action of the vehicle door to provide a good draught and moisture proof seal. Formed integrally with the effective portion 2 is an attachment portion 3, the two parts being, for example, produced as a moulding or extrusion from rubber or other comparatively soft, but resilient material, the attachment portion 3 being formed with an integral inwardly directed lip 4 which is intended to prevent moisture finding its way into the interior of the clip and possibly causing corrosion of the supporting flange.

The attachment portion 3 is attached to an associated metal clip 5 in the form of a continuous length, the clip being formed in known manner with a series of slots 6 (see FIGURE 4) which slots project inwardly from the opposite edges of the strip from which the clip is formed, the slots being staggered and having a depth substantially greater than half the width of the strip, whereby the clip will be capable of universal bending movement, the draught excluder strip being thus capable of being bent around curves of quite small radius.

The clip in cross section is of substantially inverted U shape and may be composed of aluminium, steel or other suitable material.

The clip 5 is covered with a woven fabric or other suitable ornamental covering material 7, the covering material being stitched as at 8 to the attachment portion 3 prior to the application of the attachment portion and covering material to the clip. One edge 9 of the covering material is turned inwardly and upwardly around the longitudinal edge of the clip and is secured by means of a series of tangs 10 which are pressed inwardly of the clip and after perforating the covering material are turned over or clenched to hold the covering material firmly in position. The clip is provided on the opposite side with outwardly directed tangs 10a which in this case perforate the attachment portion, the extremities of the tangs being again turned over or clenched to secure the attachment portion to the clip. As will be seen clearly from FIGURE 4 the perforations in the clip bordering the tangs run parallel with the longitudinal axis of the clip and consequently when the tangs have been bent inwardly and outwardly at right angles to the clip and have perforated both the covering material and attachment portion their extremities may be turned over or clenched by passing the strip and its associated clip between rollers or other parts which are capable of performing the clenching operation.

To secure the clip and its associated parts in position on the supporting flange 1, the clip is formed with inwardly and upwardly directed pointed tangs 11, the tangs being so inclined that the clip can be forced easily onto the flange, but will effectively resist its removal, the tangs tending to dig into the surface of the flange.

In order to increase the frictional engagement between the tangs 11 and the flange 1, the limbs of the clip are preferably inclined slightly towards one another before application of the clip to the flange as is shown clearly in FIGURE 3.

As is shown clearly in FIGURE 1 the inwardly and upwardly directed part 9 of the covering material and the lip 4 on the attachment portion fit the flange snugly on its opposite sides and in addition to excluding moisture also assist in preventing any rocking movement of the strip in relation to the flange.

Referring now to FIGURES 2 and 3 of the drawings, it will be seen that no effective part 2 is provided, the strip being in the form of an ornamental beading or moulding which need not necessarily have draught excluding or sealing properties, although it will be appreciated that the covering material 7 may be composed of rubber or other soft, but resilient material with this object in view. In FIGURES 2 and 3 the clip is provided with staggered tangs 10, the tangs associated with opposite sides of the clip being all directed inwardly to perforate the upwardly turned edges 9 of the covering material.

FIGURES 5, 6 and 7 illustrate alternative arrangements of tangs 10 and 10a, the tangs as shown in FIGURE 5 corresponding with FIGURE 1, whilst in the case of FIGURE 6 the tangs correspond with those shown in FIGURES 2 and 3. In the case of FIGURE 7 the lower edges of the clip are turned outwardly as at 12 to provide a lead to facilitate application of the clip to the supporting flange.

In FIGURE 8 which illustrates an alternative form of sealing strip, beading or moulding, the covering material in this case which is again indicated by reference numeral 7 is composed of rubber or other suitable soft, but resilient material, the covering fitting closely around the clip 5 or alternatively a series of clips which may conveniently be referred to as tags and arranged in end-to-end or spaced relationship. The lower edges of the covering material 7 are turned inwardly to provide inwardly directed beads 4 for engaging opposite sides of the flange to provide a moisture proof seal. The continuous clip 5, if such is provided, or the tags, if used, is or are formed with upwardly directed tangs 13 which pass through the centre of the covering 7 and have their extremities turned over or clenched to secure the covering 7 in position on the clip or series of tags.

Instead of the tangs 13 being centrally positioned on the clip 5 or series of tags they may be associated with one of the limbs as in FIGURE 9 and in this case the opposite edge of the covering will be turned inwardly and upwardly around the opposite edge of the clip or series of tags to assist in locating the covering in position. As will be seen clearly from FIGURES 8 and 9 the covering 7 is moulded with a longitudinally arranged recess 14 into which the extremities of the tangs can project after perforating the covering. As will be seen clearly the mouth 14a of the recess permits the entry of a roller or other part for performing the clenching operation, whilst the limb-like parts 15 bordering the recess may, particularly in the case of FIGURE 9, form leaf-like effective portions for making sealing engagement with a door or other closure member.

FIGURES 10 to 12 illustrate the strip from which the continuous length clip shown in FIGURE 4 is bent up, FIGURES 11 and 12 illustrating alternative positioning of the tangs 10 or 10a.

Although as in the constructions illustrated, it is preferred to employ tangs 10 and 10a for securing the covering to the continuous clip, it is nevertheless within the scope of the present invention to employ and alternative form of attachment, such as for example, sewing.

Instead of constructing the clip from strip material, it may alternatively be composed of wire, for example, thin steel piano wire, which is bent into zig-zag formation so that when it is finally bent into the required substantially inverted U-shape form, it will have the properties associated with the clip shown in FIGURE 4 in that it will be capable of universal bending movement, the wire being bent or crimped inwardly to make frictional engagement with the flange and, if desired, be bent or crimped inwardly and/or outwardly to form tangs for perforating the covering and securing the latter in position. The covering in such a case may completely surround the wire component and if composed of rubber or other similar mouldable material may, in fact, be moulded around the wire clip.

Although a sufficiently good frictional interlocking engagement with the flange can be obtained if the clip is pressed out of strip aluminium, it is preferred to construct the clip from steel strip so that the tangs will more effectively bite into the surface of the supporting flange.

The effective portion 2, if such is provided, may be of solid, tubular, part-tubular, leaf or other desired cross sectional shape, and may be composed of any suitable material, such as natural or synthetic rubber, sponge rubber or a suitable thermoplastic synthetic resin composition. Although it is preferred to employ tangs for connecting the covering or attachment portion to the continuous clip, sewing may, as previously mentioned, be employed as an attachment means, or even a suitable adhesive. It will be appreciated from the foregoing description that such a draught excluding strip, beading or moulding as has been described can be easily and quickly applied to a supporting flange, and will effectively maintain its position thereon by virtue of the frictional engagement between the inwardly directed tangs which are preferably of pointed formation and the supporting flange. Furthermore, by virtue of its simple construction the sealing strip, beading or moulding can be cheaply and easily manufactured.

This application is a division of application Serial No. 505,115, filed May 2, 1955.

What is claimed is:

1. A device of the type used to attach lengths of sealing material to a flange marginal to an opening that comprises an elongated metal clip generally U-shaped in cross section, said clip having a plurality of longitudinally spaced slots each extending transversely thereof, adjacent slots originating at opposite edges of said clip and each terminating in a bifurcated portion defined by a generally triangular tang, each tang being located on the opposite side of the bight of the clip from the edge of origin of the respective slot, said tangs extending inwardly toward one another.

2. A device of the type used to attach lengths of sealing material to a flange marginal to an opening that comprises an elongated metal clip generally U-shaped in cross section, said clip having a plurality of longitudinally spaced slots each extending transversely thereof, adjacent slots originating at opposite edges of said clip and each terminating in a wide portion having at its end a bifurcated portion defined by a generally triangular tang, each tang being located on the opposite side of the bight of the clip from the edge of origin of the respective slot, said tangs having their points extending toward one another and toward the bight of the clip, the longitudinal spacing of said slots being such that parallel transverse projections of the widest portions of adjacent slots do not overlap.

References Cited in the file of this patent

UNITED STATES PATENTS

| | | |
|---|---|---|
| 2,554,452 | Bright | May 22, 1951 |
| 2,699,581 | Schlegel | Jan. 18, 1955 |
| 2,724,877 | Ramsay | Nov. 29, 1955 |